United States Patent
Murata et al.

(10) Patent No.: US 10,106,917 B2
(45) Date of Patent: Oct. 23, 2018

(54) POLYPHENYLENE SULFIDE MONOFILAMENT AND MANUFACTURING METHOD THEREFOR, AND PACKAGE

(71) Applicant: Toray Industries, Inc., Tokyo (JP)

(72) Inventors: Sho Murata, Nagoya (JP); Sumio Yamaguchi, Nagoya (JP); Tsuyoshi Hayashi, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/536,264

(22) PCT Filed: Dec. 15, 2015

(86) PCT No.: PCT/JP2015/085014
§ 371 (c)(1),
(2) Date: Jun. 15, 2017

(87) PCT Pub. No.: WO2016/104236
PCT Pub. Date: Jun. 30, 2016

(65) Prior Publication Data
US 2017/0342600 A1    Nov. 30, 2017

(30) Foreign Application Priority Data
Dec. 22, 2014   (JP) .................. 2014-258755

(51) Int. Cl.
| | |
|---|---|
| *C08G 75/00* | (2006.01) |
| *D01F 6/76* | (2006.01) |
| *C08G 75/0209* | (2016.01) |
| *D01D 5/088* | (2006.01) |
| *D01D 5/16* | (2006.01) |
| *D01D 7/00* | (2006.01) |

(52) U.S. Cl.
CPC ......... *D01F 6/765* (2013.01); *C08G 75/0209* (2013.01); *D01D 5/088* (2013.01); *D01D 5/16* (2013.01); *D01D 7/00* (2013.01)

(58) Field of Classification Search
CPC .. C08G 75/14; C08G 75/025; C08G 75/0281; C08F 6/28
See application file for complete search history.

(56) References Cited

U.S. PATENT DOCUMENTS

2010/0285315 A1    11/2010   Horiguchi et al.

FOREIGN PATENT DOCUMENTS

| | | |
|---|---|---|
| JP | 51-60721 A | 5/1976 |
| JP | 1-239109 A | 9/1989 |
| JP | 6-49707 A | 2/1994 |
| JP | 8-269832 A | 10/1996 |
| JP | 10-60734 A | 3/1998 |
| JP | 2000-178829 A | 6/2000 |
| JP | 2003-253521 A | 9/2003 |
| JP | 2006-257619 A | 9/2006 |
| JP | 2009-68149 A | 4/2009 |
| JP | 2011-106060 A | 6/2011 |
| JP | 2012-136797 A | 7/2012 |
| JP | 2012-246599 A | 12/2012 |

*Primary Examiner* — Shane Fang
(74) *Attorney, Agent, or Firm* — DLA Piper LLP (US)

(57) ABSTRACT

A polyphenylene sulfide monofilament is characterized by having a continuous heat-shrinking stress variation of at most 5% and a size uniformity (U %, Normal value) of at most 1.2%; and a drum-shaped fiber package includes the wound polyphenylene sulfide monofilament described. The polyphenylene sulfide monofilament has a very small aperture variation rate and is optimal for high-precision filters.

2 Claims, 1 Drawing Sheet

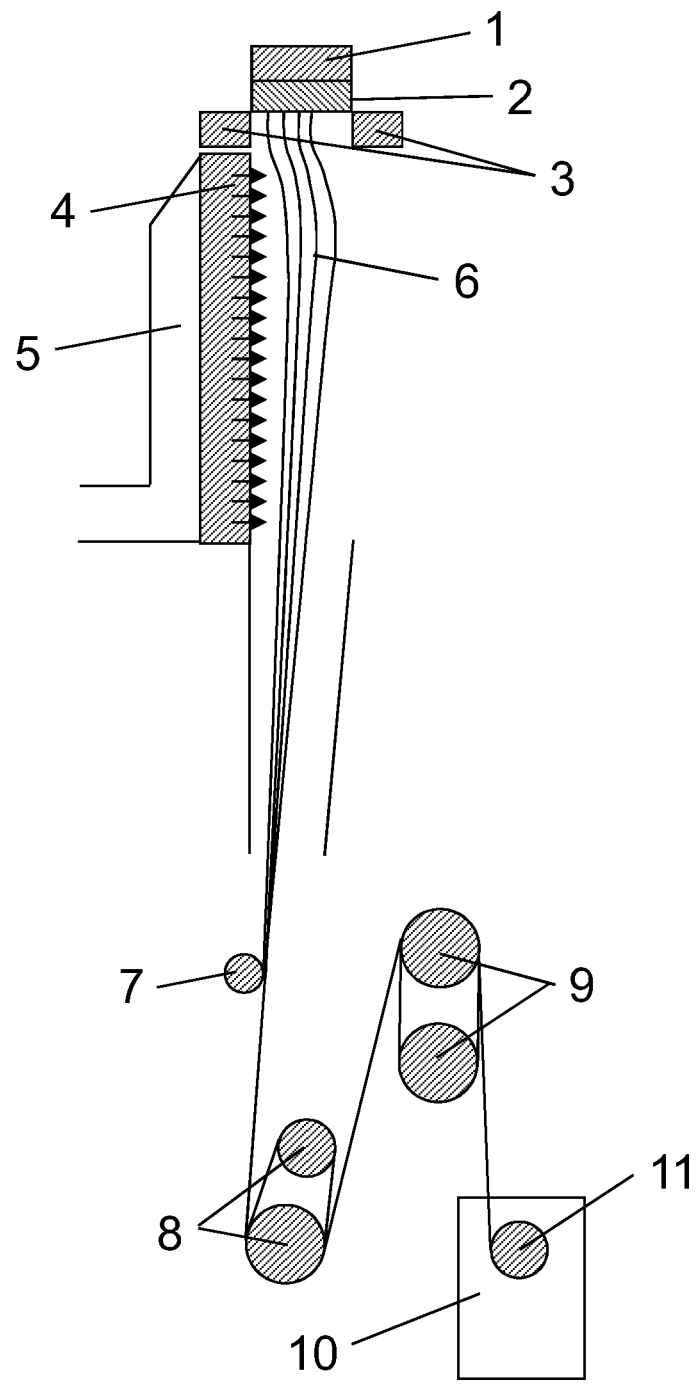

POLYPHENYLENE SULFIDE MONOFILAMENT AND MANUFACTURING METHOD THEREFOR, AND PACKAGE

TECHNICAL FIELD

This disclosure relates to a polyphenylene sulfide (hereinafter abbreviated as PPS) monofilament and its package and, more specifically, a PPS monofilament suitable for the application of high precision filter.

BACKGROUND

PPS has excellent heat resistance, chemical resistance, and electric insulation and, also, excellent mechanical strength and molding workability. Accordingly, PPS is widely used as a metal substitute material and a material capable of enduring extreme environment. Various applications are also proposed for PPS fibers in view of these properties, and exemplary applications include filter, bristle of brush, canvas of dryer in paper making, electric insulation paper and other industrial materials. For example, Japanese Unexamined Patent Publication (Kokai) No. H10-60734 discloses a method of producing a PPS fiber with reduced fineness irregularity in a stable manner.

Recently, use of the PPS monofilament has been investigated as a substitute for SUS steel wire in the production sites of the fields including chemistry, electrics and electronics, automobiles, foods, precision machines, and pharmaceutical products and medicine. For example, Japanese Unexamined Patent Publication (Kokai) No. 2012-246599 proposes a method wherein a multifilament is first produced and then separated into monofilaments for the production of the monofilament with high productively at low cost. In that method, however, stretching and thermal setting are conducted with the monofilaments entangled by the entanglement treatment in step of producing the multifilament and the stretching and thermal setting are likely to be inconsistent between respective monofilaments, and the monofilaments after the separation are likely to suffer from fineness irregularity in axial direction of the fiber detracting from the production of consistent monofilaments. In addition, many guides and similar members are present in the separating steps, and the filaments are easily damaged by the friction and, because of the frictional tension and the like, the monofilament after the separation exhibited increased variation of the continuous heat shrinkage stress in axial direction of the fiber detracting from the production of consistent monofilament. Accordingly, the consistency in the physical properties in axial direction of the fiber was lost in the separated filament, and such separated filament was incapable of producing the high precision filters.

Furthermore, Japanese Unexamined Patent Publication (Kokai) No. 2011-106060 proposes a method wherein a small amount of a polyalkylene terephthalate is added to obtain the PPS monofilament having improved dimensional stability. However, due to addition of the polyalkylene terephthalate, that method suffered from the problems of loss of heat resistance and chemical resistance as well as loss of consistency in the physical properties in longitudinal direction by the blend irregularity, which resulted in the incapability of use for the high precision filter.

Furthermore, Japanese Unexamined Patent Publication (Kokai) No. 2009-68149 proposed a PPS monofilament having improved consistency of fineness in the intention of improving filter performance. While that PPS monofilament was certainly capable of producing filters having a certain precision, it was found that that PPS monofilament was incapable of responding to the recent demand for drastic increase in filter precision because an increase in filter precision requires control of the variety in the tension during the weaving of the filter, and Japanese Unexamined Patent Publication (Kokai) No. 2009-68149 does not at all indicate the method of solving such problems. As described above, there has been no PPS monofilament adapted for use in producing a high precision filter having an extremely low aperture variation rate and, accordingly, there is a strong demand for a PPS monofilament adapted for use in high precision filter.

It could therefore be helpful to provide a PPS monofilament with a very low aperture variation rate that is highly adapted for use in high precision filters.

SUMMARY

We thus provide:
(1) A polyphenylene sulfide monofilament wherein variation of continuous heat shrinkage stress in axial direction of the fiber is up to 5%, and consistency of fineness (U %, Normal value) is up to 1.2%.
(2) A drum-shaped package having the polyphenylene sulfide monofilament according to the above (1) wound thereon.
(3) A method of producing a polyphenylene sulfide monofilament comprising the steps of melting a polyphenylene sulfide resin, extruding filaments from a spinning nozzle and cooling the filaments by a cooler, applying an oil agent to the filaments, taking the filaments on a heated take up roller, stretching the filaments between the take up roller and a heated stretching roller, and winding the filaments in drum shape; wherein (a) temperature inconsistency between the center and periphery of the spinning nozzle surface is up to 3° C., and (b) each filament is cooled by a cooling gas stream at a temperature of at least 5° C. and up to 20° C. in the area within 100 mm from the spinning nozzle.

Use of the PPS monofilament enables provision of a high precision filter having high heat resistance and chemical resistance as well as extremely low aperture variation rate.

BRIEF DESCRIPTION OF THE DRAWING

FIG. 1 is a schematic view showing our spinning process.

EXPLANATION OF NUMERALS

1: nozzle
2: heated vapor generator
3: heater under the nozzle
4: cooling gas stream
5: cooling gas stream blower
6: filament
7: oiling roller
8: first roller
9: second roller
10: winder
11: package

DETAILED DESCRIPTION

The PPS has a basic repetitive structural unit comprising p-phenylene sulfide, and it may also contain other copolymerization structural units. Exemplary such copolymerization structural units include aromatic sulfides such as m-phenylene sulfide and biphenylene sulfide, and any of these substituted with an alkyl or a halogen. Also, other polymers may be added by mixed spinning, composite spinning or the like, and exemplary such other polymers include a polyester, polyamide, polyolefin, and polyimide. The amount of the copolymerization component and the polymer added is preferably up to 3% by weight since the heat resistance and the chemical resistance will be retained at high level when the amount is in such range. The amount is more preferably up to 1% by weight and, still more preferably, the copolymerization component and the polymer are preferably not added.

Also, additives such as antioxidant, heat resisting agent, agent to prevent thermal degradation, weathering agent may be added preferably at an amount of up to 1% by weight. Favorable spinnability can be realized when the amount is up to 1% by weight. The amount of additives added is more preferably up to 0.5% by weight.

In addition, the PPS is preferably polymerized by a quenching method with reduced content of the low molecular weight PPS. Use of such polymer with reduced content of the low molecular weight PPS prevents smudging of the nozzle during spinning, and stable production of the PPS monofilament is thereby enabled.

To produce a filter having a very high precision, variation of the continuous heat shrinkage stress in axial direction of the PPS monofilament should be suppressed simultaneously with the realization of the improved evenness of the fineness.

The continuous heat shrinkage stress in the axial direction of the fiber is the shrinkage stress continuously measured in axial direction of the fiber while generating the shrinkage stress by moving the fiber under heat treatment. More specifically, the continuous heat shrinkage stress in axial direction of the fiber is determined by moving the filament between a filament-feeding roller and a filament-take up roller, subjecting the filament to dry heating treatment between these rollers, and continuously measuring the shrinkage stress (cN) by using a tensiometer provided behind the rollers. Variation of the continuous heat shrinkage stress in axial direction of the fiber is a value obtained by dividing standard deviation of the thus measured continuous heat shrinkage stress by the average. More specifically, the measurement is conducted at a measurement frequency of 6 measurements/1 cm, and by regarding the average of these measurements as 1 data, 1000 data are collected. The average and the standard deviation are then calculated from these 1000 data, and the variation of the continuous heat shrinkage stress is calculated by the following equation. The average and the standard deviation are automatically calculated when using "continuous heat shrinkage measuring instrument FTA-500" manufactured by TORAY ENGINEERING Co., Ltd.

(Variation of the continuous heat shrinkage stress)= (standard deviation)/(average)×100

We found that this variation of continuous heat shrinkage stress in axial direction of the fiber affects the variation of tension in the weaving of the filter. In other words, if the continuous heat shrinkage stress is stable, variation in the tension during the weaving will also be reduced, and this enables production of a high precision filter. The variation of the continuous heat shrinkage stress required for realization of such situation is up to 5%, and more preferably up to 3%. The lower limit is at least 0%.

One preferable means of reducing this variation of the continuous heat shrinkage stress in axial direction of the fiber to the range of up to 5% is suppressing the variation of stretching tension in the step of stretching the filament.

To suppress the variation of stretching tension, variation in the temperature of the nozzle surface is preferably reduced to up to 3° C., and more preferably up to 1.5° C. The variation of nozzle surface temperature is the difference between the maximum temperature and the minimum temperature of 5 positions in total (the center of the nozzle and the arbitrary 4 points at a distance 5 mm from the outer periphery of the nozzle). We found that temperature of the ejected polymer will be consistent and stable when the variation in the temperature of the nozzle surface is up to 3° C. and the ejection and the cooling will also be stable, and that this leads to the stable stretching tension in the subsequent stretching step. An exemplary method of suppressing the variation of nozzle surface temperature is heating the nozzle from the underside of the nozzle surface by a heater, and more preferably, the underside of the nozzle is filled with heated vapor. The temperature of the heater under the nozzle surface is preferably in the range of spinning temperature ±20° C., and more preferably the spinning temperature ±10° C.

Another important property for the production of the filter having an extremely high precision is consistency of the PPS monofilament fineness. The consistency of fineness is represented by Uster irregularity (U %, Normal value), and a U % of up to 1.2%, preferably up to 1.0%, and more preferably up to 0.9% is required for the production of the filter having an extremely high precision. The lower limit is at least 0%. To realize such high consistency of fineness, the step of cooling the polymer ejected from the nozzle is very important.

In the cooling step, the medium used for the cooling is preferably a gas (air). The cooling by a gas (cooling gas stream) will receive lower resistance from the polymer compared to the cooling by a liquid and this is favorable in view of the consistency of fineness.

The cooling gas stream is preferably at a temperature of at least 5° C. and up to 20° C., and more preferably at a temperature of at least 5° C. and up to 10° C. When the temperature of the cooling gas stream is up to 20° C., the polymer will be sufficiently cooled, and this leads to the improvement in the consistency of fineness.

In addition, the distance at the start of the cooling is preferably up to 100 mm and more preferably up to 80 mm from the nozzle surface. When the distance at the start of the cooling is up to 100 mm, solidification point of the polymer ejected from the nozzle will be stable, and this leads to the improvement in the consistency of fineness.

In the production of a high precision filter, winding shape of the PPS monofilament is also extremely important, and the package is preferably in a drum shape. When the package is in a drum shape, the defect in the form of streak called "pirn mark" that occurs in the use of a pirn-shape package can be suppressed.

The PPS monofilament may preferably have a fineness of 6 to 33 dtex and more preferably 6 to 22 dtex. When the fineness is 6 to 33 dtex, pressure loss by filtration will be reduced even if the filter has a higher density.

In addition, the PPS monofilament preferably has a strength of at least 3.0 cN/dtex, and more preferably at least 3.5 cN/dtex. When the strength is at least 3.0 cN/dtex, the filter will exhibit an improved durability.

The PPS monofilament also preferably has a dimensional change rate by hot water immersion of up to 10%, and more preferably up to 6%. When the dimensional change rate by hot water immersion is up to 10%, the filter will enjoy an improved dimensional stability when used in high temperature environment.

The PPS monofilament is preferably produced by a one-step method wherein the monofilament is produced by direct spinning. Use of a one-step method results in the reduced variation of the stretching tension and this leads to decrease in the variation of the continuous heat shrinkage stress. The use of a one-step method also results in the drastically improved productivity.

Another exemplary method of producing the PPS monofilament is production of multifilament followed by division into the monofilament. However, the preferred is use of the one-step method wherein the monofilament is produced by direct spinning.

Next, a preferable example of the method of producing the monofilament is described.

The PPS resin is as described above.

The PPS resin used for the spinning is preferably adjusted by using a dryer so that content of the low molecular weight components is up to 0.15% by weight, and more preferably up to 0.1% by weight before its use for the spinning. By removing the polymer components having a lower boiling point to the minimum possible content, smudging of the nozzle face in the melt spinning will be suppressed and stable production of a PPS monofilament having excellent consistency of fineness as well as reduced variation of the continuous heat shrinkage stress will be possible.

In the melt spinning, the melt extrusion of the PPS resin may be conducted by a known method. The extruded polymer is guided through the piping, a known measuring instrument such as gear pump where it is measured, a filter for foreign body removal, and then to the nozzle. The polymer at this stage is preferably at a temperature of 300 to 330° C., and more preferably at 310 to 320° C.

To produce the PPS monofilament having excellent consistency of fineness, the nozzle hole may preferably have a hole diameter D of at least 0.10 mm and up to 0.50 mm, and the ratio of the land length L of the nozzle hole (length of the straight pipe section having the diameter the same as the nozzle hole) to the hole diameter D of the hole, namely, L/D is preferably at least 1.0 and up to 8.0. The number of holes per nozzle is preferably at least 4 in view of the productivity and up to 8 in view of cooling the filament.

The nozzle surface temperature and the cooling of the filament ejected from the nozzle are as described above.

The cooled and solidified filament is taken up by a heated first roller, and continuously stretched between the first roller and the second roller as described above. While a single hook type, separate roller type, and Nelson type may be used for the first roller and the second roller, use of a Nelson type is preferable in view of improving stability in the filament heating and fixing the filament heating speed.

The take up speed of the first roller is preferably 300 to 1000 m/min, and more preferably 400 to 800 m/min.

The first roller is preferably heated to a temperature not lower than the temperature 10° C. lower than the glass transition temperature of the polymer and not higher than the temperature 20° C. higher than the Tg of the polymer. When the temperature is in such range, the stretching will be conducted in the state wherein flowability of the PPS is sufficient and variation of the stretching tension will be suppressed.

The second roller is preferably heated to a temperature of at least 140° C. and up to 250° C. When the temperature is at least 140° C., improvement in the strength and dimensional stability will be possible.

With regard to the winding, the winding may be conducted by using a known winder. The package, however, is preferably a drum-shape package as described above.

The thus obtained PPS monofilament is used in the warping by a warping machine to realize the intended opening, and after interlacing the wefts by rapier loom, water-jet loom, or the like, the resulting woven product is cut for use as a filter. Exemplary applications of this filter include injection filter in automobile engines and filters used in medical field.

EXAMPLE (1) Aperture Variation Rate

PPS monofilaments were aligned in a warping machine at 380 monofilaments/inch (2.54 cm) and weaving was conducted by using a rapier loom at 380 monofilaments/inch (2.54 cm) (so that the aperture was square). The test woven product was observed by a scanning electron microscope (ESEM-2700 manufactured by Nikon) at a magnification of 1000. More specifically, inter-filament distance of the aperture at any 20 positions (the part with the maximum distance in each aperture) was respectively measured in the order of 0.1 μm. The aperture variation rate was calculated by the following equation:

$$\text{(Aperture variation rate)}=\text{(standard deviation)}/\text{(average)}\times 100$$

With regard to the aperture variation rate, the aperture variation rate of up to 3% which is the index for a high precision filter was evaluated "pass".

(2) Variation of the Continuous Heat Shrinkage Stress

The measurement of the continuous heat shrinkage stress was conducted by using "continuous heat shrinkage stress measurement instrument FTA-500" manufactured by TORAY ENGINEERING Co., Ltd. The measurement was conducted by moving the filament between a filament-feeding roller and a filament-take up roller at 5 m/min, subjecting the filament to dry heating treatment between these rollers (temperature: 100° C.; unit length: 10 cm), and continuously measuring the stress caused by heat (cN) by a tensiometer provided behind the rollers. The measurement is conducted at a measurement frequency of 6 measurements/1 cm, and by regarding the average of these measurements as 1 data, 1000 data are collected. The average and the standard deviation were calculated from the thus obtained 1000 data, and the variation of the continuous heat shrinkage stress was calculated by the following equation. The average and the standard deviation are automatically calculated by the measurement instrument.)

$$\text{(Variation of the continuous heat shrinkage stress)}=\text{(standard deviation)}/\text{(average)}\times 100$$

(3) Uster Irregularity (U %)

Measurement was conducted by using USTER TESTER 5 manufactured by Zellweger Uster (measurement type, Normal mode; throttle used, AUTO; No twister) at a filament feeding speed of 800 m/min for 1 minute. The thus obtained value was used for the Uster irregularity (U %).

(4) Variation of Nozzle Surface Temperature

Temperature of 5 positions in total, namely, temperature at the center of the nozzle and temperature at arbitrary 4 points at a distance 5 mm from the outer periphery of the nozzle were measured by using a thermocouple. The difference between the maximum temperature and the minimum temperature was used for the variation of nozzle surface temperature.

(5) Variation of Stretching Tension

By using TTM-101 tensiometer manufactured by TORAY ENGINEERING Co., Ltd., the stretching tension was measured for 1 minute between the first and the second rollers at a position about 20 cm from the second roller, and the value was recorded at an interval of 0.1 second. Standard deviation and the average were calculated, and then, the variation of stretching tension was calculated by the following equation:

(Variation of stretching tension)=(standard deviation)/(average)×100     (5)

(6) Fineness

Fineness was calculated according to JIS L 1013 (2010) 8.3.1 A.

(7) Strength and Elongation

Strength and elongation were measured according to JIS L 1013 (2010) 8.5.1.

(8) Dimensional Change Rate by Hot Water Immersion

Dimensional change rate by hot water immersion was measured according to JIS L 1013 (2010) 8.18.1 A.

Next, our PPS monofilaments, methods and packages are described in detail by referring to Examples.

Example 1

The PPS polymer pellet used was E2280 (glass transition temperature; 93° C., quenching method) manufactured by Toray, and the content of the low molecular weight component of the pellet adjusted with a drier to the range of up to 0.1%. The pellets were subjected to melt spinning at a spinning temperature of 320° C. at a single nozzle ejection rate of 4.25 g/min. The polymer temperature at this stage was 313° C. The spinning machine used was a spinning machine for one-step method shown in FIG. 1 adapted for direct stretching. In the spinning, nozzle (1) having circular holes at 8 holes/nozzle was used. The diameter of the nozzle hole (D) was 0.40 mm, and the L/D was 6.0. The temperature of the nozzle surface was retained by heated vapor at 330° C. The variation of the nozzle surface temperature was 0.8° C. The polymer ejected from the nozzle was cooled by cooling gas stream (4) at 10° C. ejected from cooling gas stream blower (5) at a position 50 mm from the nozzle surface. After the oiling by oiling roller (7), the filament was taken up by first roller (8) heated to 100° C. at 625 m/min and continuously stretched between first roller (8) and second roller (9) heated to 200° C. to 4.00 folds. The variation of the stretching tension at this stage was 11.5%. The filament after the stretching was then wound by using a micro-cam traverse type winder (10) to obtain a drum-shaped fiber package (11), and woven by using a rapier loom.

The resulting PPS monofilament had yarn properties and evaluation results of the woven product as shown in Table 1.

The resulting PPS monofilament had the U % of 0.78% and the variation of the continuous heat shrinkage stress of 2.3%. The woven product was excellent with the aperture variation rate of 1.4%.

Example 2

PPS monofilament was produced by repeating the procedure of Example 1 except that the method used to retain the temperature of the nozzle surface was heating with air instead of heated vapor. The resulting PPS monofilament had yarn properties and evaluation results of the woven product as shown in Table 1.

A change in the method used to retain nozzle surface temperature to the heating by air resulted in a slight increase (1.3° C.) of the variation of the nozzle surface temperature. However, the variation of the stretching tension was 13.8%, the variation of the continuous heat shrinkage stress was 2.9%, and U % was 0.85%. The woven product was excellent with the aperture variation rate of 1.8%.

Example 3

PPS monofilament was produced by repeating the procedure of Example 2 except that the temperature of the cooling gas stream was 5° C. The resulting PPS monofilament had yarn properties and evaluation results of the woven product as shown in Table 1.

The change of the cooling gas stream temperature to 5° C. resulted in an improved cooling efficiency compared to Example 2 and the U % was 0.75%. However, the variation of the nozzle surface temperature increased to 2.2° C., and the variation of the stretching tension became 15.6%. As a result, the variation of the continuous heat shrinkage stress was 4.4%. However, the woven product was excellent with the aperture variation rate of 2.6%.

Example 4

PPS monofilament was produced by repeating the procedure of Example 2 except that the distance at the start of the cooling was 100 mm. The resulting PPS monofilament had yarn properties and evaluation results of the woven product as shown in Table 1.

The change of the distance at the start of the cooling to 100 mm resulted in the U % of 1.11%. However the variation of the nozzle surface temperature was stabilized to 1.0° C., and the variation of the stretching tension was at 12.5%, and the variation of the continuous heat shrinkage stress was 2.7%. The woven product was excellent with the aperture variation rate of 2.8%.

TABLE 1

|  |  | Example 1 | Example 2 | Example 3 | Example 4 |
|---|---|---|---|---|---|
| Spinning conditions | Process | One-step method | One-step method | One-step method | One-step method |
|  | Package shape | Drum | Drum | Drum | Drum |
|  | Single nozzle ejection rate (g/min) | 4.25 | 4.25 | 4.25 | 4.25 |
|  | Spinning temperature (° C.) | 320 | 320 | 320 | 320 |
|  | Method of retaining nozzle surface temperature | Heater under the nozzle surface + Heated vapor | Heater under the nozzle surface | Heater under the nozzle surface | Heater under the nozzle surface |
|  | Temperature of heater under the nozzle surface (° C.) | 330 | 330 | 330 | 330 |
|  | Distance at the start of the cooling (mm) | 50 | 50 | 50 | 100 |
|  | Temperature of cooling gas stream (° C.) | 10 | 10 | 5 | 10 |
|  | Spinning speed (m/min) | 625 | 625 | 625 | 625 |
|  | Stretch ratio (—) | 4.00 | 4.00 | 4.00 | 4.00 |
|  | Variation of nozzle surface temperature (° C.) | 0.8 | 1.3 | 2.2 | 1.0 |
|  | Variation of stretching tension (%) | 11.5 | 13.8 | 15.6 | 12.5 |

TABLE 1-continued

|  |  | Example 1 | Example 2 | Example 3 | Example 4 |
|---|---|---|---|---|---|
| yarn properties | Variation of the continuous heat shrinkage stress (%) | 2.3 | 2.9 | 4.4 | 2.7 |
|  | U % (%) | 0.78 | 0.85 | 0.75 | 1.11 |
|  | Fineness (dtex) | 17.0 | 17.1 | 17.0 | 16.9 |
|  | Strength (cN/dtex) | 4.21 | 4.16 | 4.41 | 3.99 |
|  | Elongation (%) | 25.4 | 24.8 | 23.8 | 26.5 |
|  | Dimensional change rate by hot water immersion (%) | 5.5 | 5.8 | 6.2 | 5.7 |
|  | Aperture variation rate (%) | 1.4 | 1.8 | 2.6 | 2.8 |

Comparative Example 1

PPS monofilament was produced by repeating the procedure of Example 1 except that the nozzle surface was retained at a temperature of 290° C. The resulting PPS monofilament had yarn properties and evaluation results of the woven product as shown in Table 2.

By retaining the nozzle surface at a temperature of 290° C., the U % became 0.91%. However, the variation of the nozzle surface temperature increased to 3.4° C., and the variation of the stretching tension also increased to 18.9%. As a result, the variation of the continuous heat shrinkage stress increased to 5.3%. The woven product was unsatisfactory with the aperture variation rate of 3.9%.

Comparative Example 2

PPS monofilament was produced by repeating the procedure of Example 1 except that the distance at the start of the cooling was 15 mm. The resulting PPS monofilament had yarn properties and evaluation results of the woven product as shown in Table 2.

The change of the distance at the start of the cooling to 15 mm resulted in the U % of 0.84%. However, the variation of the nozzle surface temperature increased to 4.1° C., and the variation of the stretching tension also increased to 20.8%. As a result, the variation of the continuous heat shrinkage stress increased to 5.5%. The woven product was unsatisfactory with the aperture variation rate of 4.5%.

Comparative Example 3

PPS monofilament was produced by repeating the procedure of Example 1 except that the distance at the start of the cooling was 200 mm. The resulting PPS monofilament had yarn properties and evaluation results of the woven product as shown in Table 2.

The change of the distance at the start of the cooling to 200 mm stabilized the variation of the nozzle surface temperature to 0.7° C., and the variation of the stretching tension was 11.7%. As a result, the variation of the continuous heat shrinkage stress was 2.5%. However, an increase in the distance at the start of the cooling resulted in the U % of 1.41%. The woven product was unsatisfactory with the aperture variation rate of 3.2%.

Comparative Example 4

The PPS polymer pellet used was E2280 manufactured by Toray, and the content of the low boiling point component of the pellet adjusted with a drier to the range of up to 1.0%. The pellets were subjected to melt spinning at a spinning temperature of 320° C. at a single nozzle ejection rate of 4.25 g/min. In the spinning, a nozzle having circular holes at 8 holes/nozzle was used. The diameter of the nozzle hole (D) was 0.4 mm, and the L/D was 6. The temperature of the nozzle surface was retained by heated vapor at 330° C. The variation of the nozzle surface temperature was 0.9° C. The polymer ejected from the nozzle was cooled by cooling gas stream at 10° C. at a position 50 mm from the nozzle surface. After oiling, the filament was taken up by an unheated first roller rotating at a constant speed of 625 m/min to obtain the non-stretched filament.

This non-stretched filament was stretched in a stretcher between the first roller heated to 100° C. and the second roller heated to 200° C. to 4.00 folds. The variation of the stretching tension at this stage was 24.5%. The filament after the stretching was then wound in pirn-shape package and woven by using a rapier loom.

The resulting PPS monofilament had yarn properties and evaluation results of the woven product as shown in Table 2.

Use of the two-step method resulted in the U % of 0.86%. However, the variation of the stretching tension increased to 24.5%, and the variation of the continuous heat shrinkage stress also increased to 6.0%. The aperture variation rate also increased to 5.5%, and use of the pirn shape resulted in generation of irregularities in the form of streaks. Due to such quality loss, the woven product was unsatisfactory.

Comparative Example 5

PPS multifilament was produced by repeating the procedure of Example 1 except that 8 filaments were integrated into one filament after the cooling of the polymer, and conducting the oiling, the stretching and the winding after the integration. In this process, the variation of the nozzle surface temperature was 1.0° C. and the variation of the stretching tension was 12.0%, which were slightly higher than those of Example 1. The thus obtained PPS multifilament was divided in a separating machine. The filament after the separation was then wound in pirn-shape package, and woven by using a rapier loom.

The resulting PPS monofilament (separated filament) had yarn properties and evaluation results of the woven product as shown in Table 2.

A separating machine has many guides and similar members in the steps before the winding of the PPS monofilaments (separated filaments), and the filaments are easily damaged by the friction, and the variation of the continuous heat shrinkage stress of the separated filament was 6.1%. Also, the thermal setting was likely to be inconsistent between respective filaments since the thermal setting was conducted with the filaments entangled by the entanglement treatment in the step of producing the multifilament, and the U % of the separated filament was 1.53%. The aperture variation rate also increased to 6.5%, and use of the pirn shape resulted in generation of irregularities in the form of streaks. Due to such quality loss, the woven product was unsatisfactory.

TABLE 2

|  |  | Comparative Example 1 | Comparative Example 2 | Comparative Example 3 | Comparative Example 4 | Comparative Example 5 |
|---|---|---|---|---|---|---|
| Spinning conditions | Process | One-step method | One-step method | One-step method | Two-step method | One-step method + Separation |
|  | Package shape | Drum | Drum | Drum | Pirn | Pirn |
|  | Single nozzle ejection rate (g/min) | 4.25 | 4.25 | 4.25 | 4.25 | 4.25 |
|  | Spinning temperature (° C.) | 320 | 320 | 320 | 320 | 320 |
|  | Method of retaining nozzle surface temperature | Heater under the nozzle surface + Heated vapor | Heater under the nozzle surface + Heated vapor | Heater under the nozzle surface + Heated vapor | Heater under the nozzle surface + Heated vapor | Heater under the nozzle surface + Heated vapor |
|  | Temperature of heater under the nozzle surface (° C.) | 290 | 330 | 330 | 330 | 330 |
|  | Distance at the start of the cooling (mm) | 50 | 15 | 200 | 50 | 50 |
|  | Temperature of cooling gas stream (° C.) | 10 | 10 | 10 | 10 | 10 |
|  | Spinning speed (m/min) | 625 | 625 | 625 | 625 | 625 |
|  | Stretch ratio (—) | 4.00 | 4.00 | 4.00 | 4.00 | 4.00 |
|  | Variation of nozzle surface temperature (° C.) | 3.4 | 4.1 | 0.7 | 0.9 | 1.0 |
|  | Variation of stretching tension (%) | 18.9 | 20.8 | 11.7 | 24.5 | 12.0 |
| Yarn properties | Variation of the continuous heat shrinkage stress (%) | 5.3 | 5.5 | 2.5 | 6.0 | 6.1 |
|  | U % (%) | 0.91 | 0.84 | 1.41 | 0.86 | 1.53 |
|  | Fineness (dtex) | 16.8 | 17.0 | 17.1 | 17.3 | 17.0 |
|  | Strength (cN/dtex) | 4.10 | 4.30 | 4.09 | 4.62 | 3.98 |
|  | Elongation (%) | 23.8 | 22.7 | 26.8 | 24.4 | 14.6 |
|  | Dimensional change rate by hot water immersion (%) | 5.4 | 6.3 | 5.0 | 6.7 | 7.2 |
|  | Aperture variation rate (%) | 3.9 | 4.5 | 3.2 | 5.5 | 6.5 |

As shown in Table 1 and Table 2, the PPS monofilaments obtained in the Examples exhibited low consistency of fineness (U %) and low variation of the continuous heat shrinkage stress, and these PPS monofilaments were capable of producing a woven product having a very low aperture variation rate, and hence a high precision filter. On the other hand, both the consistency of fineness (U %) and the variation of the continuous heat shrinkage stress could not be reduced in the PPS monofilaments obtained in the Comparative Examples, and these PPS monofilaments were incapable of producing a high precision filter.

INDUSTRIAL APPLICABILITY

The filters of extremely high precision produced by using the PPS monofilaments are suitable for use in the production sites in the fields including chemistry, electrics and electronics, automobiles, foods, precision machines, and pharmaceutical products and medicine.

The invention claimed is:

1. A polyphenylene sulfide monofilament having a variation of continuous heat shrinkage stress in an axial direction of each fiber of up to 5%, and a consistency of fineness (U %, Normal value) of up to 1.2%.

2. A drum-shaped package having the polyphenylene sulfide monofilament according to claim 1 wound thereon.

* * * * *